（12） United States Patent
Taylor

(10) Patent No.: US 9,354,729 B2
(45) Date of Patent: May 31, 2016

(54) PROTECTIVE DEVICE

(71) Applicant: Dane Taylor, Westlake Village, CA (US)

(72) Inventor: Dane Taylor, Westlake Village, CA (US)

(73) Assignee: Safewrites, LLC, Westlake Village, CA (US)

( * ) Notice: Subject to any disclaimer, the term of this patent is extended or adjusted under 35 U.S.C. 154(b) by 232 days.

(21) Appl. No.: 13/779,451

(22) Filed: Feb. 27, 2013

(65) Prior Publication Data

US 2013/0248098 A1    Sep. 26, 2013

Related U.S. Application Data

(60) Provisional application No. 61/614,310, filed on Mar. 22, 2012.

(51) Int. Cl.
*G06F 3/039* (2013.01)

(52) U.S. Cl.
CPC ............ *G06F 3/039* (2013.01); *Y10T 29/49826* (2015.01); *Y10T 29/49876* (2015.01); *Y10T 428/13* (2015.01); *Y10T 428/24273* (2015.01)

(58) Field of Classification Search
CPC .............. G06F 3/039; Y10T 29/49876; Y10T 29/49826; Y10T 428/24273; Y10T 428/13

USPC ............ 29/453, 428; 156/247, 294; 428/34.1, 428/131

See application file for complete search history.

(56) References Cited

U.S. PATENT DOCUMENTS

| | | | |
|---|---|---|---|
| 6,485,211 B1 * | 11/2002 | Leo ...................... | B43K 23/008 16/421 |
| 2005/0191112 A1 * | 9/2005 | Yoon ............................. | 401/108 |
| 2009/0136386 A1 * | 5/2009 | Duffy et al. .................... | 422/104 |

* cited by examiner

*Primary Examiner* — John C Hong
(74) *Attorney, Agent, or Firm* — Ganz Pollard LLC

(57) ABSTRACT

A protective device having an elongate tubular body for covering at least a portion of a writing instrument that is handled by a user, the instrument having a first opening at a proximal end and a second opening at a distal end, the first opening allowing the instrument to be passed into and received into the body of the device, and at least one section of the tubular body having an internal profile configured to removably engage the writing instrument in a friction or interference fit, thereby securing the protective device and the writing instrument together. The tubular body may include a plurality of sections along its longitudinal axis, each section having a different an internal profile configured to provide a frictional or interference engagement to the writing instrument, the profiles being arranged in order of decreasing internal diameter.

16 Claims, 5 Drawing Sheets

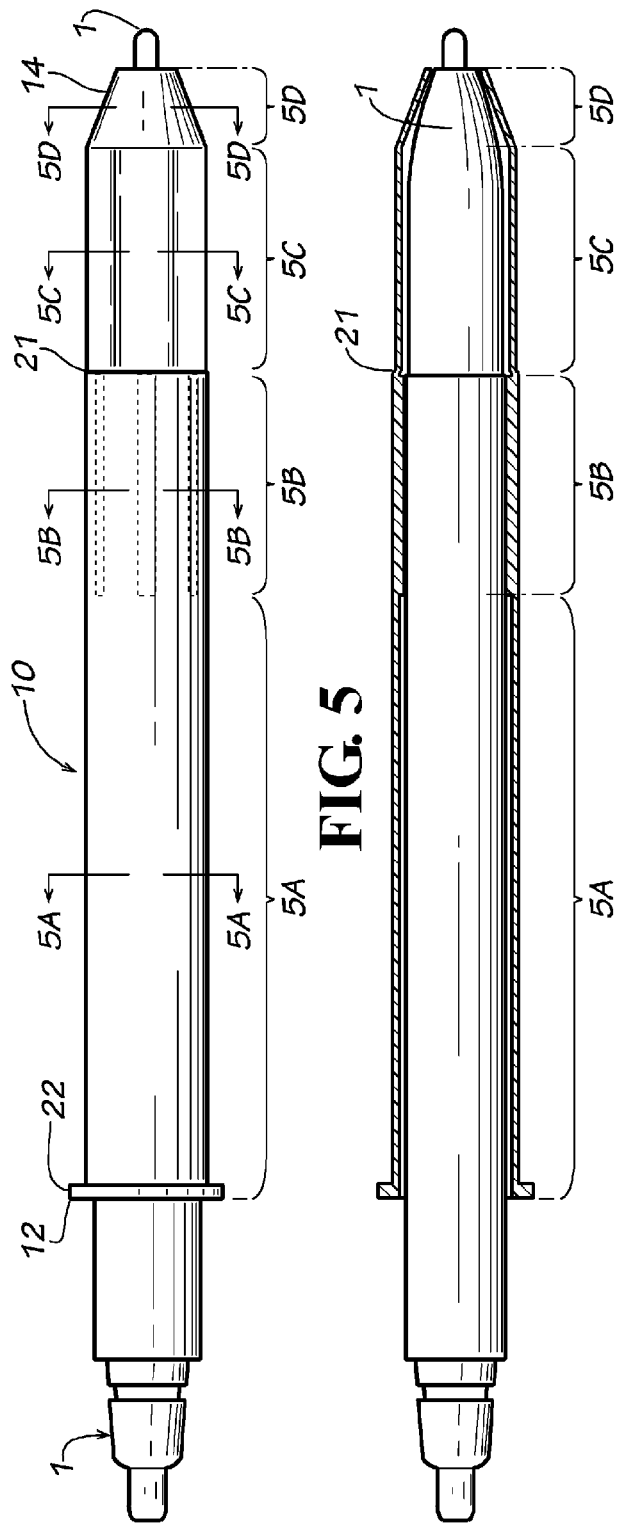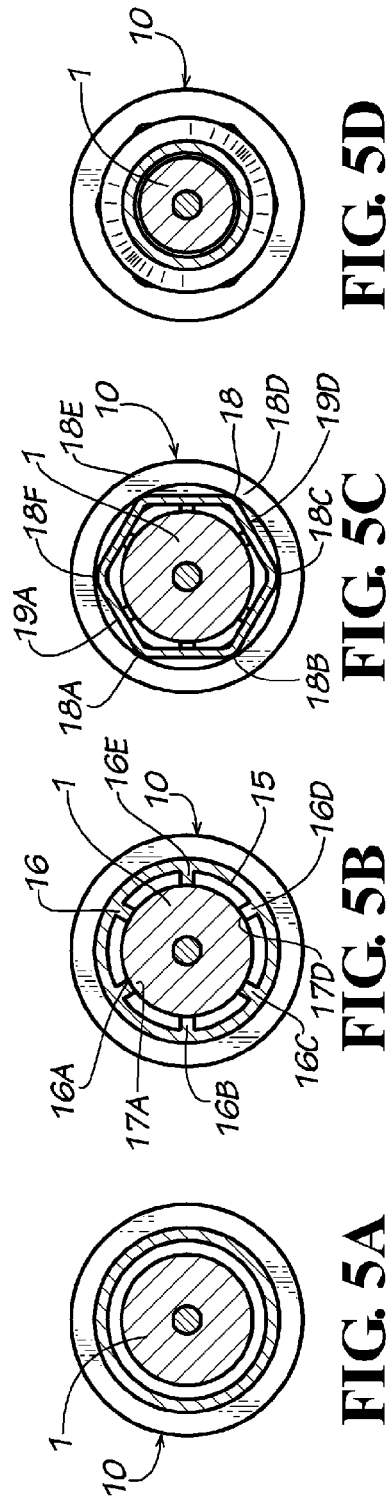

PROTECTIVE DEVICE

RELATED APPLICATIONS

This application claims the benefit of and priority to U.S. Provisional Application Ser. No. 61/614,310, filed Mar. 22, 2012, the contents of which are hereby incorporated by reference as if recited in full herein for all purposes.

BACKGROUND

The inventive subject matter disclosed herein, which encompasses various embodiments and permutations of inventive features, generally relates to protective devices for electronic signature instruments.

Electronic writing systems are based computerized user-interfaces have become increasingly popular and are used to generate handwritten materials, including, writings, drawings, and digital signatures. For example, a pen or stylus may be used with a graphics tablet or touchscreen, as opposed to using a more traditional interface such as a keyboard, keypad, or mouse. The pen or stylus is used to write and draw on an interface to create displayable and storable objects, as well as to touch, press, or drag on simulated objects rendered on the display of an interface. Electronic touch-sensitive pads, such as signature pads and other electronic writing systems are available from various electronic manufactures. Hereinafter, "touchpad" refers to an electronic pad that can be used to input electronic inscriptions. Typically, a touchpad is pressure sensitive but some may operate in other modes, such as via optical or magnetic sensors or other sensors that track the position of a writing instrument.

Digital signatures are well-recognized as a method of sealing and authenticating electronic documents. They provide all the signature characteristics that institutions and organizations need to replace dependence on paper and handwritten signatures and to allow for electronic storage of and interacting with signed documents.

For example, healthcare organizations are increasingly relying on computerized devices that allow for digital notes and digital signatures (standard electronic signatures) for medical records as a way to improve patient safety, workflow inefficiencies, and cost concerns. Medical records with writings, such as digital signatures are a simple, effective means for recording and storing signatures while ensuring document authenticity and integrity.

In hospitals and other sites of medical assistance and healthcare, infectious diseases can be caused by pathogens, such as bacteria, viruses, fungi and or parasites. The two primary ways of spreading infectious diseases are either through direct person-to-person contact or indirect contact person-to-object-to-person contact. The easiest way to catch most infectious diseases is by coming in direct contact with someone who has one. This "someone" can be a person, an animal, or for an unborn baby, its mother. Disease-causing organisms can also be passed along by indirect contact. Many germs can linger on an inanimate object, such as a tabletop, doorknob, or a public writing instrument (pen) such as those used with electronic signature pads. When a person handles a pen or stylus used by another person, that person can pick up the infectious agent left by the other person and become infected.

With the growing discretionary and mandatory use of electronic writing instruments in hospitals and other settings, the potential for disease-causing organisms to be passed along by this indirect contact may increase as the use of these instruments becomes more commonplace.

Accordingly, there is a need for protective devices that address these problems.

SUMMARY

The inventive subject matter offers a solution for these problems by providing a protective device with the following qualities, alone or in various combinations. In some embodiments the inventive subject matter is directed to a protective device having an elongate tubular body for covering at least a portion of a writing instrument that is handled by a user, the instrument having a first opening at a proximal end and a second opening at a distal end, the first opening allowing the instrument to be passed into and received into the body of the device, and at least one section of the tubular body having an internal profile configured to removably engage the writing instrument in a friction or interference fit, thereby securing the protective device and the writing instrument together. The tubular body may include a plurality of sections along its longitudinal axis, each section having a different an internal profile configured to provide a frictional or interference engagement to the writing instrument, the profiles being arranged in order of decreasing internal diameter. In some embodiments, contemplated herein, the tubular body may include a distal opening that allows a writing tip of the writing instrument to protrude from the protective device. In some embodiments contemplated herein, the protective body includes a distal end configured for inputting inscriptions on an electronic touch pad. In some embodiments contemplated herein, the internal profile for at least one section comprises a ribbed profile or a polygonal profile. In some embodiments contemplated herein, at least one internal profile comprises a ribbed profile and at least one profile comprises a polygonal profile. In some embodiments contemplated herein, the tubular body has at least two different sections allowing engagement with at least two different writing having differing outer profiles of varying outer diameters. In some embodiments contemplated herein, the tubular body has at least three different sections allowing engagement with at least three different writing having differing outer profiles of varying outer diameters. In some embodiments contemplated herein, the tubular body has at least four different sections allowing engagement with at least four different writing having differing outer profiles of varying outer diameters. In some embodiments contemplated herein, the tubular body has at least five different sections allowing engagement with at least five different writing having differing outer profiles of varying outer diameters. In some embodiments contemplated herein, the tubular body comprises a molded plastic material. In some embodiments contemplated herein, the distal section of the tubular body comprises a tapered portion for engaging the distal end of the writing instrument in an interference fit. In some embodiments contemplated herein, the tubular body further comprises a flange extending around protruding the tubular body. In some embodiments contemplated herein, the protective device includes a built-in safety feature that indicates whether or not the device has been used. In some embodiments contemplated herein, a color change occurs based on changes in pressure or temperature to the protective device.

In some embodiments the inventive subject is directed to a kit comprising: a holder having a plurality of apertures in a first layer of material configured to receive a plurality of protective devices and expose the proximal end of the protective devices to a user, the holder being configured to allow a user to insert a writing instrument into protective while the protective device is fixed within the holder and then to release the assembly of the protective device and writing instrument when a user pulls on the assembly. In some embodiments contemplated herein, The kit holder comprises a packing container for a plurality of protective devices, the packing container having four sides and a bottom surface and an openable top surface of one or more portions, the layer or material with the opening being disposed within the container and oriented above and generally parallel to the bottom side of the container. In some embodiments contemplated herein, the holder includes a second layer of material disposed above or below the first layer of material and generally parallel to the first layer, the second layer having a corresponding set of apertures aligning with the apertures of the first layer so that a protective device may be received in a pair of apertures in the first and second layers. In some embodiments, the inventive subject matter is directed to a method of protecting a writing instrument, comprising: (a) providing protective device, comprising: an elongate tubular body for covering at least a portion of a writing instrument that is handled by a user, the device having a first opening at a proximal end and a second opening at a distal end, the first opening allowing the instrument to be passed into and received into the body of the device; and at least one section of the tubular body having an internal profile configured to removably engage the writing instrument in a friction or interference fit, thereby securing the protective device and the writing instrument together; (b) assembling the writing protective device to a writing instrument intended for use with a touchpad device; and (c) using the assembled instrument and protective device to create or update a medical record presented on the touchpad device. In some embodiments contemplated herein, the method includes the further step of removing the protective device from the writing instrument and repeating steps (a)-(b).

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The following figures show embodiments according to the inventive subject matter, unless any are noted as showing prior art.

FIG. 5 shows a side elevational view of a second embodiment of a protective device for a writing instrument with the writing instrument in place.

FIG. 5.1 shows a longitudinal cross-section of the device and writing instrument of FIG. 5.

FIGS. 5A-5D show cross section of the device and writing instrument of FIG. 5 taken along respectively corresponding to the lines indicated in FIG. 5.

DETAILED DESCRIPTION

Figure 1:
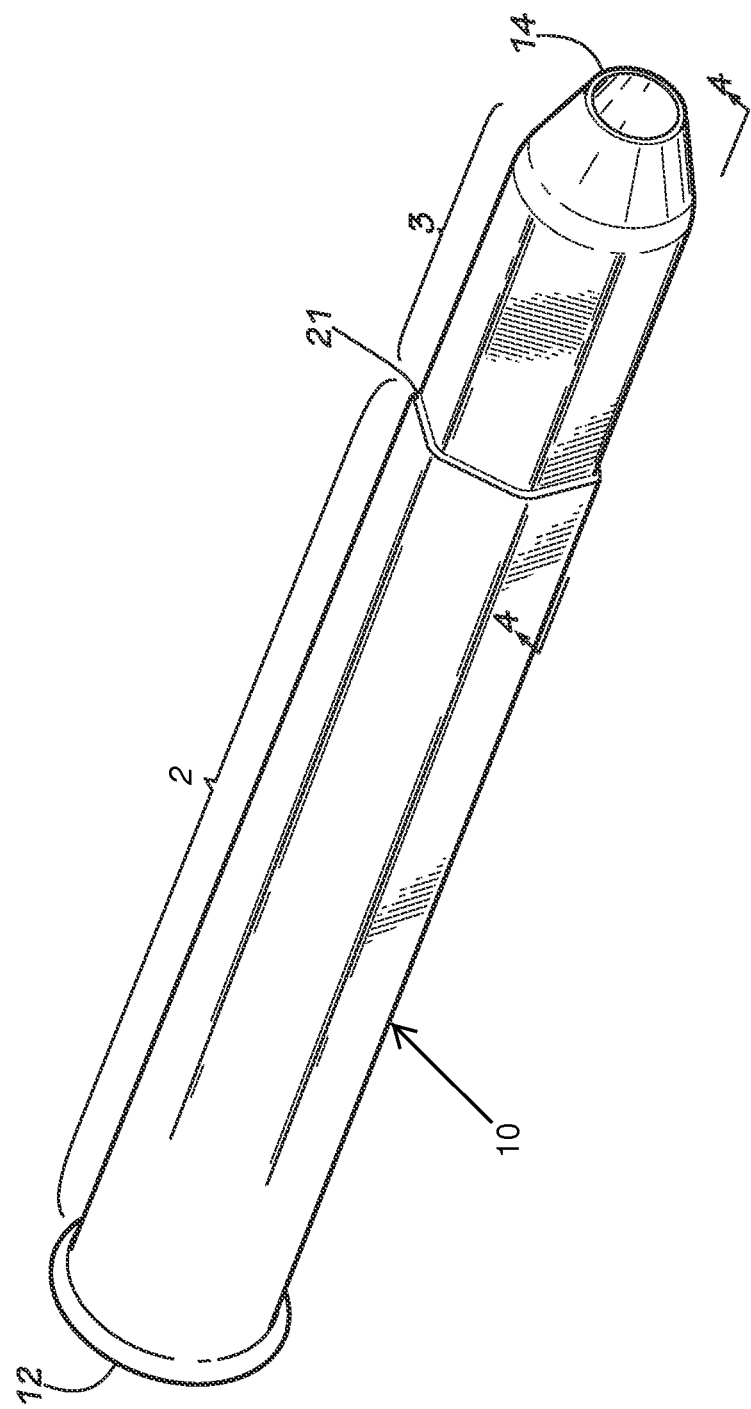
FIG. 1 shows a front-side perspective view of a first embodiment of a protective device for a writing instrument.

Representative embodiments according to the inventive subject matter are shown in FIGS. 1-7, wherein the same or generally similar features share common indicators.

The inventive subject matter is generally directed to protective devices for handheld writing instruments, such as a digital pen or stylus, especially electronic instruments. The writing implement may be a pen or stylus and the protective device a cover that is adapted to be removably secured to the instrument such that the cover completely covers the portion of the instrument that is held during use and thereby physically isolates the implement from contaminants. Use of the cover reduces the chances of spreading contamination between users, such as patients in a hospital.

Electronic touchpads may have an associated writing instrument. For example, a stylus usually refers to a narrow elongated staff, similar to a ballpoint pen that may be used with PDAs, graphics tablets, Tablet PCs, etc. The user operates a touchscreen with a stylus, rather than using a finger, which allows for finer and more precise inscriptions and avoids getting the natural oil or contaminants from one's hands on the screen. Some writing instruments may have electronics present in the pen, others may be a simple pointed staff.

Many electronic touchpads and signature pads, such as graphics tablets, use electronic writing instruments that have electric circuitry, for example powered by battery or operating passively by change of inductance. The pen conveys user actions to the tablet. The tablet may detect varying degrees of pressure sensitivity. Typically, the writing instrument have a general elongated cylindrical shape and a pointed tip. Writing instruments may be active or passive. Passive instruments merely apply pressure or other input to a touchpad with appropriate sensors. Active instruments have electronics for interacting with the touchpad. For example, some instruments may have an electronic contact point protruding at one end and electronics for recording pen movements. Active or passive writing instruments may be tethered to the digital device to prevent loss, for example by a simple string or a spiral cord. Other writing instruments may be in electrical communication with the associated writing pad, for example via a plug and wire connecting the back end of the pen to the writing pad or via wireless communication protocols.

The inventive subject matter relates to protective devices for covering a writing instrument so that a user can operate the writing instrument without the user's fingers or hand contacting the writing instrument. The protective device has a generally tubular body having a first opening at a proximal end and a second opening at a distal end. The first opening at the proximal end may be configured for receipt of an electronic writing instrument. The tubular body may include an engaging portion with interference points along an inner surface so that the protective device provides a frictional engagement to the electronic writing instrument. The distal opening allows a writing tip of the electronic writing instrument to protrude from the protective device. The protective device is generally shaped and dimensioned to be used on the majority of electronic pens in the medical industry. The frictional engagement configuration may be such that it allows the sheath to be used on multiple kinds of pens of different sizes and shapes.

As used herein, a "writing instrument" refers to a generally pen-shaped or stylus-shaped instrument that is used to input signatures or commands to a touchpad such as found on tablet computer device, signature pad, computer screen, mobile device, or other graphics tablet. A user places the electronic writing instrument on the surface of the screen to make inscriptions, such letters, words, marks, drawings or to make selections by tapping the stylus on selectable areas on the screen.

Figure 2:
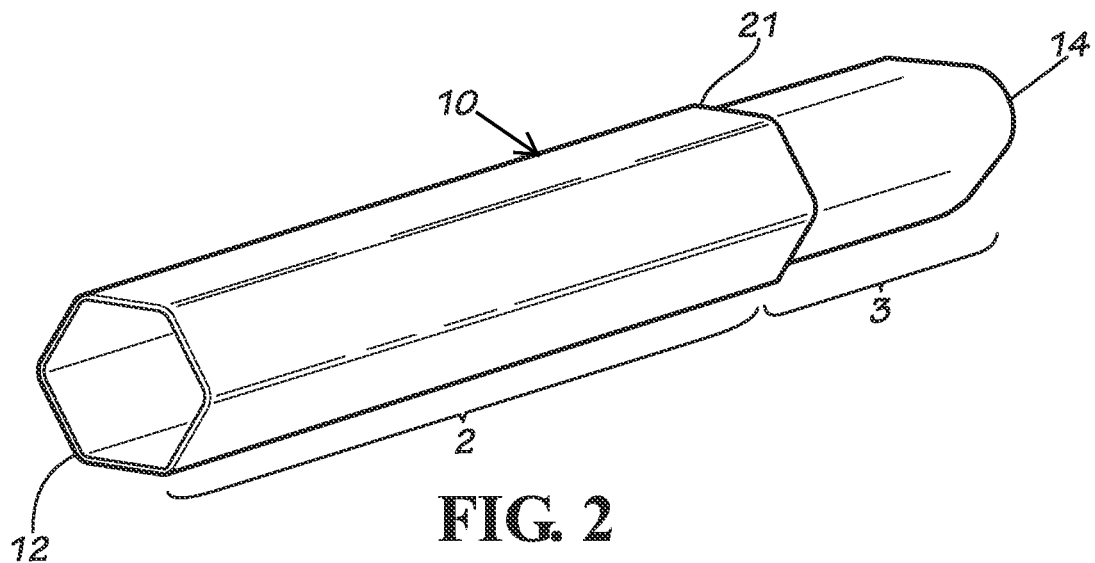
FIG. 2 shows a rear-side perspective view of the protective device of FIG. 1.

Referring to FIGS. 1-2, a first embodiment of a protective device 10 consists of a hollow and elongated body that is configured to engage with a plurality of writing instruments of differing outer configurations. In this embodiment, the elongated body may be defined in terms of a proximal region 2 and distal region 3, with the diameter stepping down going from region 2 to region 3.

Figure 3:
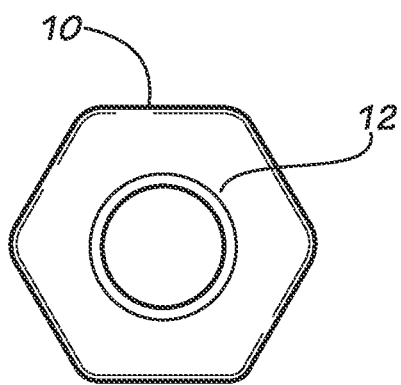
FIG. 3 shows a front elevational view of the protective device of FIG. 1.
Figure 4:
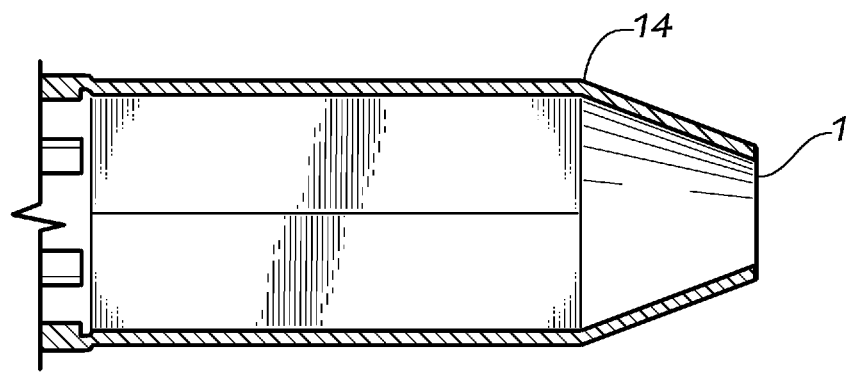
FIG. 4 shows a longitudinal cross-section of the protective device of FIG. 1 taken along line 4-4.
Figure 6:
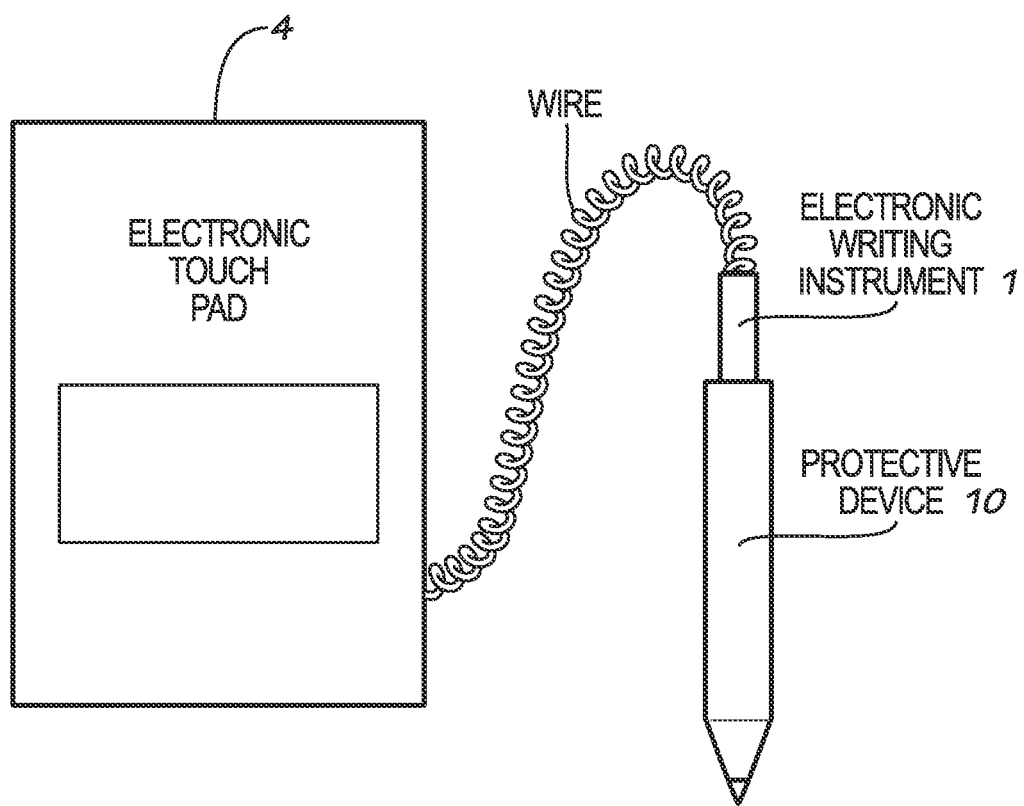
FIG. 6 shows a schematic view of an assembly of a protective device, a writing instrument, and an electronic touch pad.

FIGS. 3-5 show a second embodiment with three separate regions 5A-5C, leading to a tip region 5D. In both embodiments, the tubular body 10 has two open ends, or an open end and a closed end. One open end for receiving a writing instrument 1 is at a proximal end 12 of the body and the other end, which may be closed or open is at the opposite, distal end 14 of the body. When applied to an electronic writing instrument 1, the tubular body snugly engages the pen and covers at least the portion of the instrument that is handled by the user. The tubular body may have an opening at the distal end to receive the tip of a digital writing instrument 1, for example, a tapered nib protruding from a shaft. FIGS. 5 & 5.1 illustrate how the tip of the instrument protrudes from the protective device when the instrument is in place. Alternatively, the body 10 may be closed-ended at the distal end 14 and the distal, end of the body may be tapered or pointed or otherwise configured for contact or other interaction with a touchpad.

In further possible embodiments, the tubular body 10 may be provided with features that assist a user in holding and applying the electronic writing instrument. For example, the protective device may have an ergonomically contoured outer surface, or the outer surface may be configured with materials or structures, e.g., ridges, dimples, cushiony rubbers or foams, conducive to gripping and comfort.

The protective device may be made of any rigid or resilient material that assists in the friction or interference fit provided by the tubular body to the writing instrument. For example, the tubular body may be made in whole or part of a plastic sheath, such as a molded polyurethane or rubbery material that helps provide a secure frictional engagement and or interference fit. In some embodiments, the tubular body may be made of a molded thermoplastic material, such as a High Density Polyethylene, for example HDPE 2815 Natural. Other suitable materials may include thin, liquid-impervious materials, such as biodegradable or bioavailable plastics to reduce plastic waste. Bioavailable plastics contain substances that can be absorbed by living systems during their normal physiological functions. By combining and modifying a variety of bio-based, oil-based and natural polymers the cost of biodegradable polymers can be reduced by making them more cost effective for use in everyday products. In other embodiments, the tubular body may be made of a metal or other rigid material.

In some embodiments, the protective device may include material(s) suitable for single use and that are easily disposable, for example biodegradable materials. In other embodiments, the protective cover may include durable or resistant materials, for example suitable for various sterilization techniques and disinfection methods. For example, the tubular body may be made of an autoclavable material such as stainless steel.

In some embodiments, the protective device may include a transparent body that allows a user to view the position of the pen within the cover. For example, when applying the cover to the pen a user can easily assess whether the pen should be pushed further into the cover and/or additional force should be applied for the tip of the pen to protrude from the distal end of the cover.

In some other possible embodiments, the protective device securely fits multiple size pens via a design that creates separate internal interference points based on the size of the barrel of each pen. This is generally achieved by configuring the tubular body 10 with a plurality of dimensional changes along its longitudinal axis that allow for frictional or interference engagement with the body of a writing instrument 1 so that a portion of the writing instrument that is handled by a user is covered sufficiently to block contaminants from reaching that portion of the instrument. For example, the embodiments shown in FIGS. 5, 5A1 & 5A-5B may fit at least five different pens based on varying internal profiles of the tubular body along its longitudinal axis, as explained below.

Protective device 10 of FIG. 5-5D has a proximal section 5A, midsection 5B, distal section 5C, and tapered, distal tip section 5D. The writing instrument 1 may similarly have varying profiles along its length. The writing instrument 1 need only engage any one or more of sections 5A-5D to be frictionally engaged or blocked in an interference fit within protective device 10. Accordingly, if each section 5A-5D is progressively smaller in internal diameter going from proximal end to distal end, as measured from two or more spaced-apart internal surface points defining an internal diameter, a first writing instrument 1 could have a greatest outer diameter at a region corresponding to section 5A and engage with only section 5A in device 10; a second writing instrument could have a greatest outer diameter at a region corresponding to section 5B and engage with only section 5B in device 10; a third writing instrument could have a greatest outer diameter at a region corresponding to section 5C and engage with only section 5C in device 10; a second writing instrument could have a greatest outer diameter at a region corresponding to section 5B and engage with only section 5B in device 10; a fourth writing instrument could have a greatest outer diameter at region corresponding to 5C and engage with only section 5C in device 10; and a fifth writing instrument could have a greatest outer diameter at a regions corresponding to section 5D and engage with only section 5D in device 10. Accordingly, in the embodiment shown, the protective device can engage at least five writing instruments, each with a different outer profile.

It is also possible that the writing instrument engages the protective at multiple sections. For example, the writing instrument 1 could have an outer diameter profile that matches the inner diameter profile so that there is engagement of all sections 5.1A-5.1D at all sections 5A-5D. Or, the writing instrument could have an hour-glass profile with engagement at just sections 5A/5A and 5C &D. Or, the writing instrument could have an elliptical or centrally-bulging profile, with engagement at just sections 5B and 5D. Other variations are possible. Further, by varying the number steps or configuration in internal diameter internal surface shape, more or less than five writing instrument outer diameter or outer surface profiles ("outer profiles") may be accommodated by a single protective device. Accordingly, the inventive subject matter contemplates a single protective device that can accommodate 1, 2, 3, 4, 5, 6 or more different writing instrument outer profiles.

In other embodiments, the engaging section(s) of the protective device 1 may have possible engagement or interference points at a circular section 5A, a ribbed section 5B, a hexagonal section 5C, and/or a tapered section 5D ending at the second opening at the distal end 14 of the tubular body 10. FIG. 5A shows that the tubular body may have a smooth internal surface along section 5A. FIG. 5B shows the internal surface of the tubular body may have a plurality of ribs 16A-E spaced about the circumference of the body. In some embodiments, the protective device may include ribs having a height relative to the inner surface 15 of the tubular body that is the same for all ribs. In other embodiments, the height of the ribs relative to the inner surface of the tubular structure may vary within a single protective device. In other embodiments, a plurality of longitudinally extending ribs may be circumferentially spaced apart at an inner surface of the tubular body. The length of the ribs may be the same or may vary. The ribs may extend towards the distal end of the tubular body and may have dimensions adapted to provide an interference fit of the protective device to the writing instrument. In some embodiments, the ribs extend towards the distal end 14 and terminate at the polygonal cross-sectional structure 18 that runs along section 5C, for example, intersecting with the polygon at the sides of the polygon about midway between corners 18A-F of the polygon 18 in Section 5C. In the embodiment shown, the polygon is a hexagon, but it could be a polygon of with a various number of sides. In such embodiments, the separation between the opposing terminal surfaces, e.g., 17A, 17D of the rib or polygon surfaces 19A, 19D, define an internal diameter of the protective device, i.e., the internal diameter is not measured from the surface 15 a rib protrudes from or the circle that encompasses the corner points of the polygon.

Another possible interference point may be provided at a step 21 providing a change in diameter so that a radius of a cross-section is smaller towards the distal end of the tubular body. A step may provide an interference point to some of the writing instruments because a portion of the instrument may have a similar change in diameter and abut the step when the cover is applied to the instrument. In some embodiments, the tubular body includes a stepped change indicating a transition from a cylindrical portion to a ribbed portion, such as a hexagonal shape, for example, as shown in FIG. 5B.

In some embodiments, the hexagonal shape of the body of the protective device may contribute to the interference or frictional engagement but also may contribute to the quick release of the electronic writing instrument from the device. For example, the ribbed or hexagonal shaped sections do not come into direct contact with the entire surface of the writing instrument, allowing for less frictional engagement and air in gaps between the body of the protective cover and the instrument, which gaps mitigate suction. Therefore, the writing instrument can be more easily discharged from protective device 10 manually by downward pressure towards the distal end of the protective cover.

In some embodiments, the inner surface of the engaging portion 5D may be tapered so that its circumference decreases towards the distal end of the tubular body 10 and contributes to an interference fit. In the embodiment shown, tapered section 5D has a smooth, circular cross-section, as seen in FIG. 5D. In other embodiments, the distal end 14 need not be tapered, and engagement along another section of the protective device serves to secure the writing instrument in place.

Figure 7:
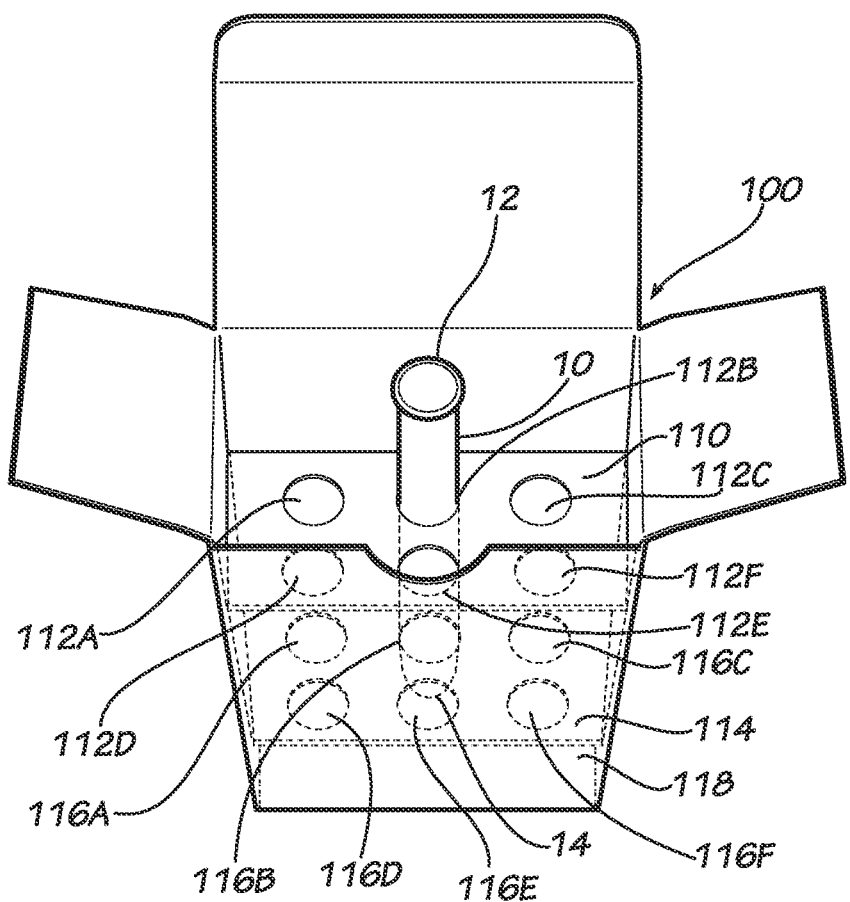
FIG. 7 shows a protective device positioned in one of plurality holders in packaging and dispensing container.

Optionally, the tubular body may have a flange or annular shoulder 22 protruding from the tubular body 10 at the proximal end. FIGS. 1, 5 and 7 show examples of protective devices having a flange at the proximal end. The flange may be dimensioned to allow manual removal of the protective device from the electronic writing instrument, for example by pushing the ridge and body forward by a simple flick of the thumb to release the protective cover from the instrument. In some embodiments, the device may be released by using a biasing mechanism located at the top of the device or instrument. For example, a ring may be disposed around the top of the instrument and coupled to a spring on the instrument such that depression of the ring toward the tip of the instrument causes the ring to engage the protective device 10 and push it off the tip of the instrument.

In some embodiments, the protective device 10 may have a built-in indicator feature that shows whether or not the device has been used. For example, the protective device may include an indicator system providing a color change that occurs based on changes in pressure or temperature. In other embodiments, the protective device may be formed of a thin plastic material, the appearance of which may change upon exposure to moisture, pressure, or skin temperature. In further possible embodiments, a visually perceptible indication of use may be included in the device, for example, an indicator material may be impregnated in the outer cover material. Other embodiments may include indicators formed of thermotropic materials, pressure sensitive compositions, or materials that change color upon exposure to humidity. In yet further embodiments, a mechanical structure such as a membrane intergrated in the device at a location where the device is held by a user may indicate a status of use.

The inventive subject matter provides a safe a secure method for getting the signatures of individuals who use an electronic writing instrument that could be covered with disease causing organisms, and thereby the protective device may assist in reducing the spread of infectious disease. The device may also protect the staff person who is assigned the responsibility for getting those signatures from disease causing organisms. By using the protective device, hospitals and other users of electronic signature pads can help in reducing the spread of infectious diseases.

The inventive subject matter is further directed to holders for protective devices and related dispensing arrangements. Protective device according to the inventive subject matter may be stored in storage boxes or other suitable packaging that allows for the safe and secure application of the pen cover onto the electronic writing instrument. Some dispensing arrangements are adapted to facilitate the application of the protective device to the writing instrument without having to touch the writing instrument directly. FIG. 7 shows a container 100, with a plurality of holders, in this case for six protective devices. The container is configured for packing and dispensing of protective devices.

The container may be include a generally rectangular cuboid structure that is fitted into a box dimensioned to hold the protective devices. In the embodiment shown in FIG. 7, the container may comprise a top portion 110 with six receiving areas, such as openings 112A-F, each dimensioned to receive a protective device. The structure may further include a bottom layer 114 for receiving and supporting the distal end 12 of each protective device 10. The bottom portion 114 may have receiving areas 116A-F that align with and correspond to receiving areas 112A-F. The bottom structure may have a double-layered construction so that when pressure is applied to the protective device the top layered of the double-layered construction provides some resistance and resilience that assists in release of the protective device from the holder. The openings 116A-F may provide an interference fit blocking and securing a device 10 or they may further support and guide the protective devices to a terminal side 118 for sealing the bottom side of the holder and blocking further movement of a device 10. The holder may be made of a firm but resilient material, such as a cardboard material.

The inventive subject matter further contemplates a kit including a holder and at least one protective device. In the embodiment shown, the holder includes receiving areas for six protective devices.

The inventive subject matter further contemplates a method for making such a device and a method for using such a device. The device is simple to make and economical to manufacture. For example, protective devices may be made by injection molding or other suitable molding techniques. With injection molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. The sequence of events during the injection mold of a plastic part is called the injection molding cycle. The cycle begins when the mold closes, followed by the injection of the polymer into the mold cavity. Once the cavity is filled, a holding pressure is maintained to compensate for material shrinkage. In the next step, the screw turns, feeding the next shot to the front screw. This causes the screw to retract as the next shot is prepared. Once the part is sufficiently cool, the mold opens and the part is ejected.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

The invention claimed is:

1. A kit comprising:
   a plurality of protective devices, each having an elongate tubular body defining an aperture positioned at a proximal end, the aperture being sized to receive two or more different writing instruments into the body, wherein each of the protective devices further defines a first internal profile configured to matingly engage a complementarily configured outer portion of one of the writing instruments to secure the protective device and a first writing instrument together, and a second internal profile, different from the first internal profile, configured to matingly engage a complementarily configured outer portion of a second of the writing instruments to secure the protective device and the second writing instrument together; and
   a holder having a plurality of apertures in a first layer of material configured to receive the plurality of protective devices and expose each respective proximal end such that a user can insert a writing instrument into a selected protective device while the protective device remains within the holder, wherein the holder having the plurality of apertures in the first layer of material is further configured to release an assembly of the protective device and writing instrument when a user pulls on the assembly.

2. The kit of claim 1, wherein one or more of the protective devices includes a distal end configured for inputting inscriptions on an electronic touch pad.

3. The kit of claim 1, wherein at least one internal profile comprises a ribbed profile and at least one profile comprises a polygonal profile.

4. The kit of claim 2, wherein one or more of the tubular bodies further defines a third internal profile configured to matingly engage a complementarily configured outer portion of one of the writing instruments to secure the protective device and the respective writing instrument together.

5. The kit of claim 4, wherein one or more of the tubular bodies further defines a fourth internal profile configured to matingly engage a complementarily configured outer portion of one of the writing instruments to secure the protective device and the respective writing instrument together.

6. The kit of claim 5, wherein one or more of the tubular bodies further defines a fifth internal profile configured to matingly engage a complementarily configured outer portion of one of the writing instruments to secure the protective device and the respective writing instrument together.

7. The kit of claim 1, wherein one or more of the tubular bodies comprises a molded plastic material.

8. The kit of claim 1, wherein the distal section of the tubular body comprises a tapered portion for engaging a distal end of one or more respective writing instruments in an interference fit.

9. The kit claim 1, wherein one or more of the tubular bodies further comprises a flange extending around protruding the tubular body.

10. The kit of claim 1, further comprising a built-in safety feature that indicates whether or not the device has been used.

11. The kit of claim 10, wherein a color change occurs based on changes in pressure or temperature to the protective device.

12. The kit of claim 11, wherein one or more of the tubular bodies includes a second opening positioned at a distal end that allows a writing tip of at least one of the writing instruments to protrude from the respective protective device.

13. The kit of claim 1 wherein the holder is supported in a packing container for a plurality of protective devices, the packing container having four sides and a bottom surface and an openable top surface of one or more portions, the layer or material with the opening being disposed within the container and oriented above and generally parallel to the bottom side of the container.

14. The kit of claim 13 wherein the holder includes a second layer of material disposed above or below the first layer of material and generally parallel to the first layer, the second layer having a corresponding set of apertures aligning with the apertures of the first layer so that a protective device may be received in a pair of apertures in the first and second layers.

15. A method of protecting a writing instrument, comprising:
   a. providing a protective device comprising an elongate tubular body being sized to receive two or more different writing instruments through a first opening at a proximal end, wherein the elongate tubular body defines a first internal profile configured to removably engage an outer surface of a first writing instrument in a friction or interference fit, thereby to secure the body and the first writing instrument together, and a second internal profile configured to removably engage an outer surface of a second writing instrument in a friction or interference fit, thereby to secure the body and the second writing instrument together;
   b. assembling the body to a selected writing instrument intended for use with a touchpad device; and
   c. using the assembled instrument and protective device to create or update a medical record presented on the touchpad device.

16. The method of claim 15 further comprising, removing the body from the selected writing instrument providing a second elongate tubular body and assembling the second body to the selected writing instrument.

* * * * *